(12) United States Patent
Cantwell et al.

(10) Patent No.: US 9,195,580 B2
(45) Date of Patent: Nov. 24, 2015

(54) SYSTEMS AND METHODS FOR USER CONFIGURATION OF DEVICE NAMES

(71) Applicant: Dell Products, LP, Round Rock, TX (US)

(72) Inventors: Thomas Cantwell, Liberty Hill, TX (US); Vijay B. Nijhawan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 32 days.

(21) Appl. No.: 13/772,610

(22) Filed: Feb. 21, 2013

(65) Prior Publication Data

US 2014/0237161 A1 Aug. 21, 2014

(51) Int. Cl.
*G06F 3/00* (2006.01)
*G06F 5/00* (2006.01)
*G06F 12/02* (2006.01)
*G06F 9/44* (2006.01)

(52) U.S. Cl.
CPC .......... *G06F 12/0238* (2013.01); *G06F 9/4401* (2013.01)

(58) Field of Classification Search
CPC ......... G06F 8/71; G06F 9/445; G06F 15/177; G06F 12/238; G06F 9/4401
USPC .............................. 710/8–10, 48, 65
See application file for complete search history.

(56) References Cited

U.S. PATENT DOCUMENTS

| | | | | |
|---|---|---|---|---|
| 5,854,905 A * | 12/1998 | Garney | ......................... | 710/104 |
| 6,009,485 A * | 12/1999 | Hosotsubo | .................... | 710/100 |
| 6,128,694 A * | 10/2000 | Decker et al. | ................. | 711/103 |
| 6,404,430 B1 * | 6/2002 | Kawamura et al. | ........... | 345/427 |
| 6,425,079 B1 * | 7/2002 | Mahmoud | ......................... | 713/2 |
| 7,076,648 B2 * | 7/2006 | Yakovlev | ....................... | 713/100 |
| 7,308,511 B2 * | 12/2007 | Wilson et al. | ..................... | 710/8 |
| 8,762,695 B2 * | 6/2014 | Li et al. | .............................. | 713/1 |
| 2003/0002078 A1 * | 1/2003 | Toda et al. | ................... | 358/1.15 |
| 2005/0246478 A1 * | 11/2005 | Tanaka | .......................... | 710/315 |
| 2006/0282535 A1 * | 12/2006 | Matsukawa et al. | .......... | 709/225 |
| 2007/0250920 A1 * | 10/2007 | Lindsay | ............................ | 726/7 |
| 2010/0169436 A1 * | 7/2010 | Graham et al. | ............... | 709/206 |
| 2011/0231584 A1 * | 9/2011 | Ishihara | .......................... | 710/16 |
| 2012/0221752 A1 * | 8/2012 | Ishihara | .......................... | 710/74 |

* cited by examiner

*Primary Examiner* — Ernest Unelus
*Assistant Examiner* — Getente A Yimer
(74) *Attorney, Agent, or Firm* — Larson Newman, LLP

(57) ABSTRACT

A system includes a device, a BIOS, and a processor. The BIOS includes a storage operable to store predefined identifier/user defined name pairs. The processor is operable to, detect the device, determine a predefined identifier for the device, and access the storage to locate a predefined identifier/user defined name pair corresponding to the predefined identifier. The processor is further operable to provide a user defined name of the predefined identifier/user defined name pair when the predefined identifier/user defined name pair is present, and provide the predefined identifier of the predefined identifier/user defined name pair when the predefined identifier/user defined name pair is not present.

18 Claims, 4 Drawing Sheets

SYSTEMS AND METHODS FOR USER CONFIGURATION OF DEVICE NAMES

FIELD OF THE DISCLOSURE

This disclosure relates generally to information handling systems, and more particularly to systems and methods for user configuration of device names.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
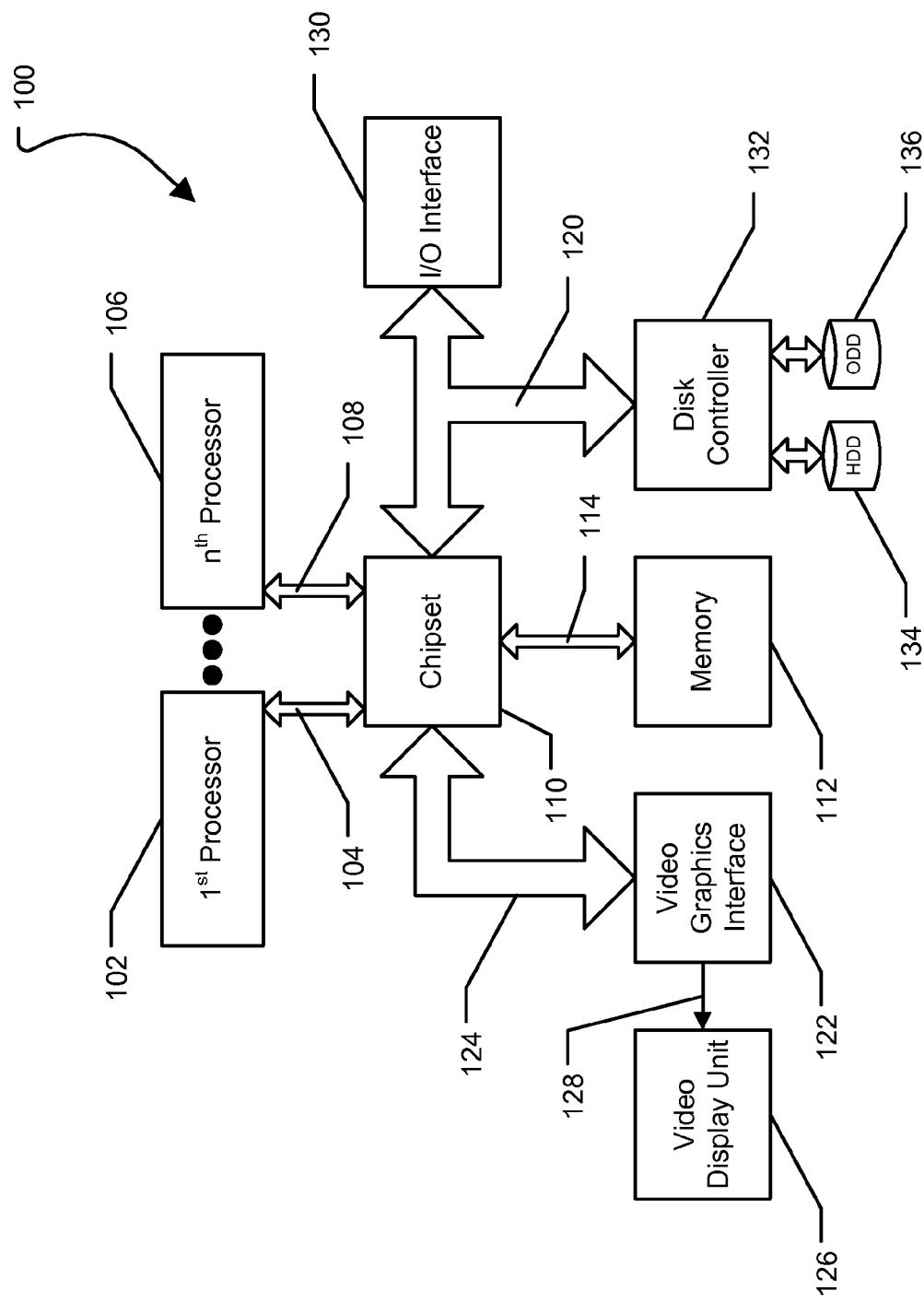
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In various embodiments, when a system detects a new device, slot, or port, it is necessary to identify the device, slot, or port during configuration and setup of the system, device, slot, or port. In various embodiments, the system can label devices in the order detected, resulting in device identifiers that fail to match physical descriptions, such as the labeling on the case. In additional embodiments, the system can label the devices based on a preconfigured set of device identifiers. For example, Ethernet ports can be identified as Eth1, Eth2, Eth3, and Eth4.

Additionally, the device names can be preconfigured to match external labeling or positioning of the devices. However, the preconfigured identifiers may not be ideal for the end user. Allowing the user to configure user-defined names for devices, users can, for example, select names that match the functionality of the device or port, such as heartbeat, storage, Internet, and intranet.

Figure 2:
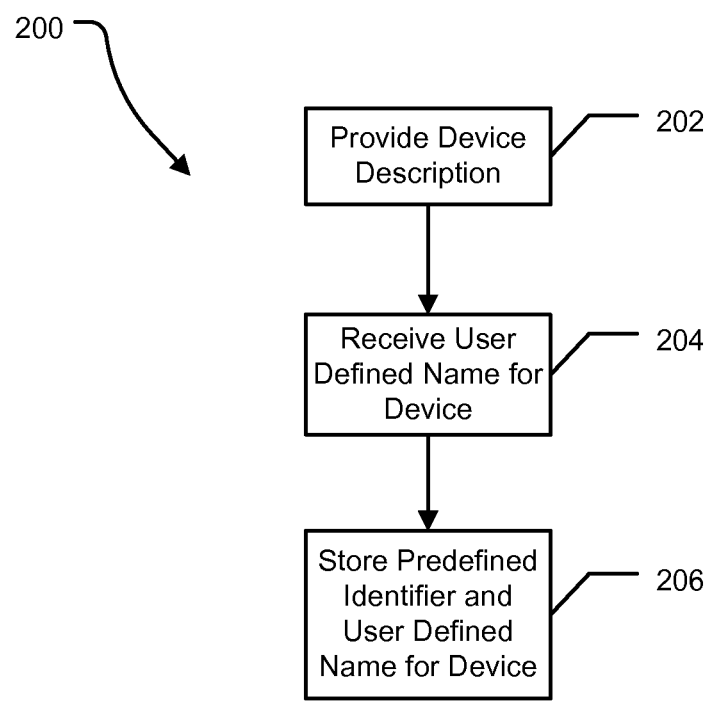
FIG. 2 is flow diagram illustrating an exemplary method for enabling a user to define a name for a device according to an aspect of the disclosure.

FIG. 2 illustrates a method of enabling a user to define device names. At 202, the system can provide a description for a device. In an embodiment, a BIOS Configuration Interface can provide a device-naming screen. The screen can include a description of one or more devices installed in the system. For example, the screen can include a system defined name for the device, a description of the type and/or location of the device, or any combination thereof. At 204, the system can receive a user-defined name for the device. In an embodiment, the device-naming screen can include a text input field and a user can type a name into the text input field. At 206, the system can store the user-defined name for the device. The user-defined name can be stored as a predefined identifier/user defined name pair. In an embodiment, the user defined name can be stored in a non-volatile random access memory (NVRAM) of the BIOS.

Figure 3:
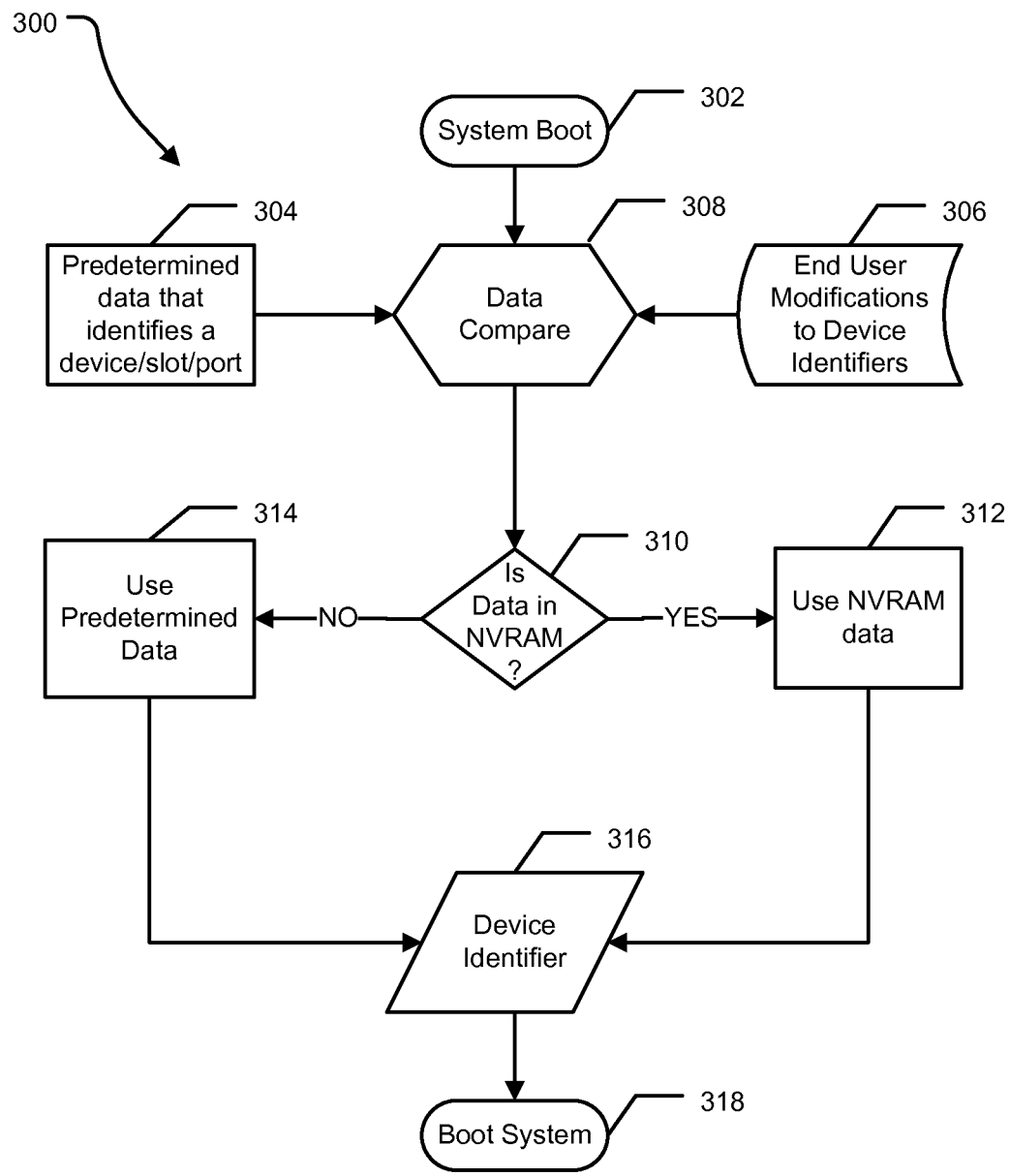
FIG. 3 is flow diagram illustrating an exemplary method for utilizing a user defined name for a device according to an aspect of the disclosure.

FIG. 3 illustrates a method of selecting a device identifier to be used by the system. At 302, the system can boot. For example, the system can be powered on. At 304, predefined or default set of data can identify a device, slot, or port. In various embodiments, this data may not be limited to physical devices or ports and can be extended to virtual devices if the ability to detect and identify them exists. In various embodiments, an identify function can return an identifier for a detected device based on predefined criteria. For example, the identify function may return device names based on the type of device and/or location, or other relevant information, irrespective of the order the device is detected.

At 306, end user modifications to device identifiers can be retrieved, such as from NVRAM of the BIOS. User defined device names can stored in a table in the NVRAM or similar area.

At 308, a comparison can be made between the predefined data and the retrieved modifications. At 310, it can be determined if an end user modification is stored for the device, slot, or port. When an end user modification for the device, slot, or port is present, the modified identifier can be selected for the device identifier, as illustrated at 312. Alternatively, when an end user modification for the device, slot, or port is not present, the predefined data can be selected for the device identifier, as illustrated at 314. At 316, the selected identifier can be provided to the system as the device identifier, and, at 318, the system can continue the boot process.

Figure 4:
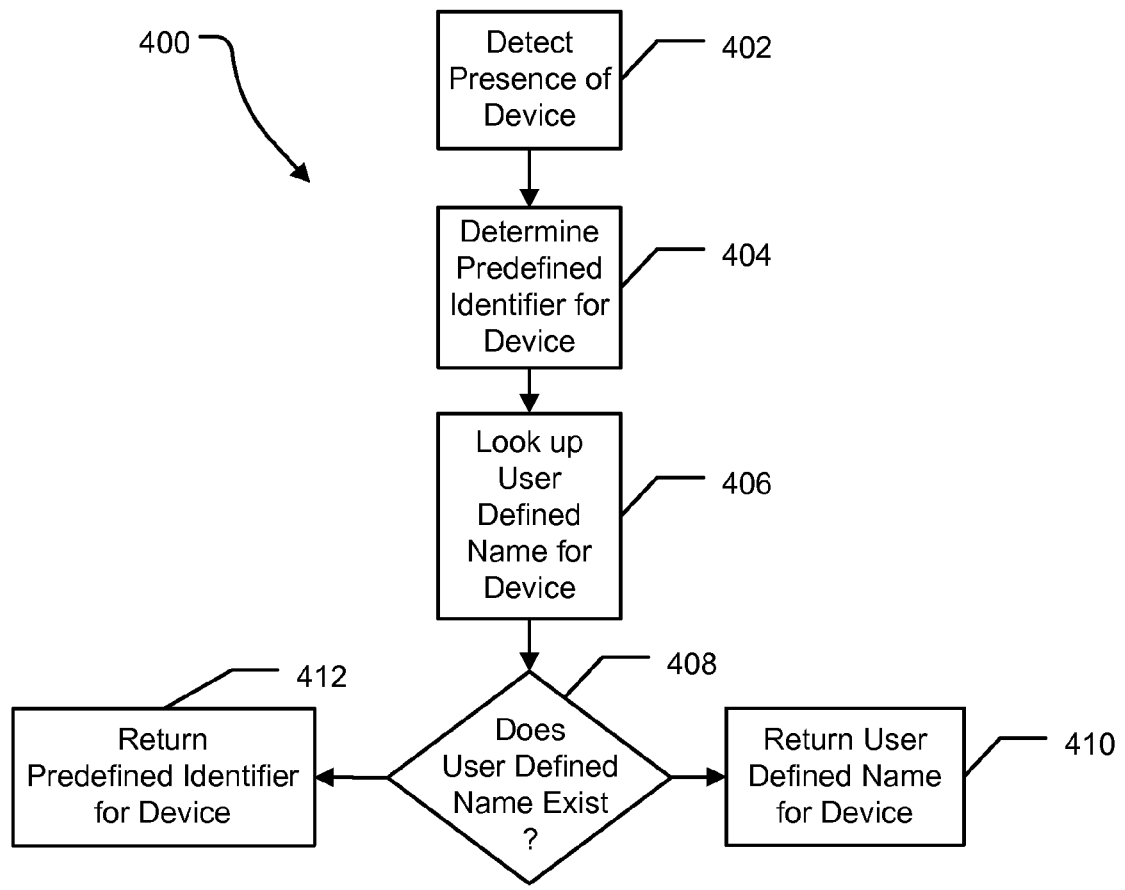
FIG. 4 is flow diagram illustrating an exemplary method for utilizing a user defined name for a device according to an aspect of the disclosure.

FIG. 4 illustrates a method of identifying a device in a system. At 402, the system can detect the presence of device, port or slot, including virtual devices, if identifiable. At 404, the system can determine a predefined identifier for the device. In an exemplary embodiment, the system may perform a function that generates a predefined identifier for the device, or may retrieve the predefined identifier from a table. At 406, the system can look up a user-defined name for the device.

In an exemplary embodiment, the system can retrieve a predefined identifier/user defined name pair corresponding to the predefined identifier, such as from a table stored in NVRAM of the BIOS, and obtain the user-defined name from the predefined identifier/user defined name pair. At 408, it can be determined if a user-defined name for the device exists. When a user-defined name for the device exists, the user defined name can be returned, as illustrated at 410. Alternatively, when the user-defined name does not exist for the device, the predefined identifier can be returned, as illustrated at 412.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   a device;
   a BIOS comprising a storage configured to store a name pair, the name pair including a predefined identifier and a descriptive name, the descriptive name being a descriptor of the device that is editable by a user; and
   a processor operable to:
     detect the device during configuration or setup of the system;
     determine a predefined identifier for the device;
     access the storage of the BIOS to locate a name pair corresponding to the predefined identifier;
     provide the descriptive name of the name pair when the name pair corresponding to the predefined identifier is present, and
     provide the predefined identifier when the name pair corresponding to the predefined identifier is not present.

2. The system of claim 1, wherein the processor is further operable to provide an interface to receive a user defined name for the device and store the predefined identifier/user defined name pair in the storage.

3. The system of claim 1, wherein the storage includes non-volatile random access memory (NVRAM).

4. The system of claim 1, where the device is a hardware or virtual device able to be identified by the system.

5. The system of claim 1, where the device is Ethernet port.

6. The system of claim 1, wherein the predefined identifier includes an indication of the type of the device and a number.

7. A computer-implemented method comprising:
   detecting a device during configuration or setup of a system;
   determining a predefined identifier for the device;
   accessing a storage of a BIOS to locate a name pair corresponding to the predefined identifier, the name pair including a predefined identifier and a descriptive name, the descriptive name being a descriptor of the device that is editable by a user;
   providing the descriptive name when the name pair corresponding to the predefined identifier is present; and
   providing the predefined identifier when the name pair corresponding; to the predefined identifier is not present.

8. The method of claim 7, wherein the processor is further operable to provide an interface to receive a user defined name for the device and store the predefined identifier/user defined name pair in the storage.

9. The method of claim 7, wherein the storage includes non-volatile random access memory (NVRAM).

10. The method of claim 7, where the device is a hardware or virtual device able to be identified by the system.

11. The method of claim 7, where the device is Ethernet port.

12. The method of claim 7, wherein the predefined identifier includes an indication of the type of the device and a number.

13. A non-transitory computer readable medium comprising a plurality of instructions to manipulate a processor, the plurality of instructions comprising:
   instructions to detect the device during configuration or setup of a system;
   instructions to determine a predefined identifier for the device;
   instructions to access a storage of a BIOS to locate a name pair corresponding to the predefined identifier, the name pair including the predefined identifier and a descriptive name, the descriptive name being a descriptor of the device that is editable by a user;
   instructions to provide the descriptive name when the name pair corresponding to the predefined identifier is present; and
   instructions to provide the predefined identifier when the name pair corresponding to the predefined identifier is not present.

14. The non-transitory computer readable medium of claim 13, further comprising instructions to provide an interface to receive a user defined name for the device; and instructions to store the predefined identifier/user defined name pair in the storage.

15. The non-transitory computer readable medium of claim 13, wherein the storage includes non-volatile random access memory (NVRAM).

16. The non-transitory computer readable medium of claim 13, where the device is a hardware or virtual device able to be identified by the system.

17. The non-transitory computer readable medium of claim 13, where the device is Ethernet port.

18. The non-transitory computer readable medium of claim 13, wherein the predefined identifier includes an indication of the type of the device and a number.

\* \* \* \* \*